United States Patent [19]

Reichmuth et al.

[11] 4,412,591

[45] Nov. 1, 1983

[54] METHOD AND APPARATUS FOR SELECTING OPERATING MODES OR PARAMETERS IN AN ELECTRICAL SCALE

[75] Inventors: Arthur Reichmuth, Greifensee; Willy Kunz, Zurich, both of Switzerland

[73] Assignee: Mettler Instruments AG, Greifensee, Switzerland

[21] Appl. No.: 322,520

[22] Filed: Nov. 18, 1981

[30] Foreign Application Priority Data

Feb. 6, 1981 [CH] Switzerland ............................ 802/81

[51] Int. Cl.³ ...................... G01G 23/22; G01G 13/14; G06F 15/20
[52] U.S. Cl. .......................................... 177/1; 177/25; 177/165; 364/466
[58] Field of Search ...................... 177/25, 1, 164, 165; 364/466

[56] References Cited

U.S. PATENT DOCUMENTS

| | | | |
|---|---|---|---|
| 3,786,884 | 1/1974 | Allensbach .......................... | 177/210 |
| 4,159,521 | 6/1979 | Hall et al. .......................... | 177/25 X |
| 4,325,440 | 4/1982 | Crowley et al. ....................... | 177/25 |
| 4,328,874 | 5/1982 | Gumberich et al. ................... | 177/25 |

*Primary Examiner*—George H. Miller, Jr.
*Attorney, Agent, or Firm*—Marianne R. Rich

[57] ABSTRACT

The plurality of selector buttons or keys previously required for selecting a mode or parameter in an electrical scale is replaced by a single key. Depression of the key causes each of the available modes and/or parameters to be selected in sequence. The title of the then-present mode or parameter is displayed. When the desired mode or parameter has been reached the operator releases the key. Submodes or ranges within a given parameter are set by short depression of the key. The sequencing is controlled by a microcomputer. Jumpers may be provided so that certain modes or parameters are eliminated from the sequence for a given application.

7 Claims, 4 Drawing Figures

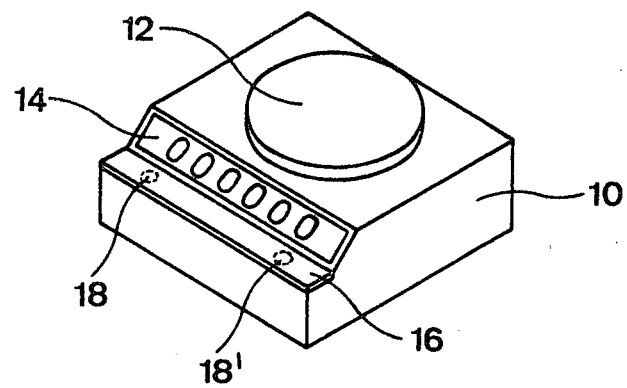
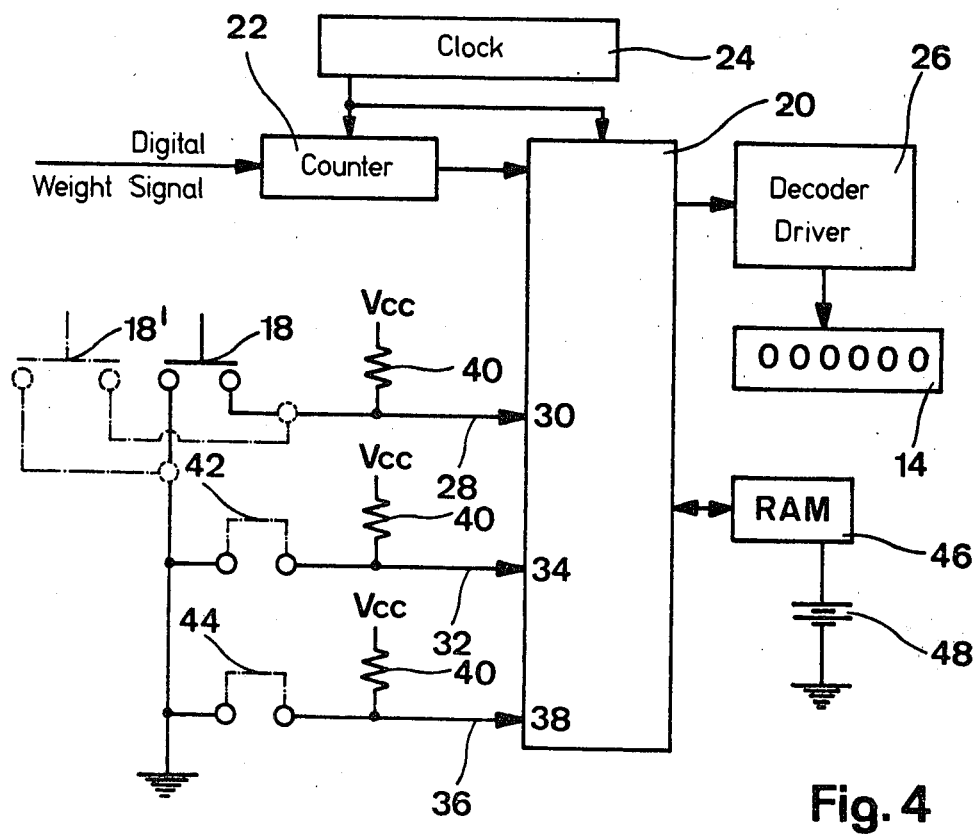
Fig. 3
Fig. 4

METHOD AND APPARATUS FOR SELECTING OPERATING MODES OR PARAMETERS IN AN ELECTRICAL SCALE

CROSS-REFERENCE TO RELATED APPLICATIONS AND PUBLICATIONS (1) U.S. Pat. No. 3,786,884, issued Jan. 22, 1974;
(2) U.S. patent application Ser. No. 322,473, filed 11/18/81
  Inventor: Karl Vogel;
  Filed: Simultaneously herewith;
  Based on: Swiss Application Number 801/81-2, of Feb. 6, 1981:
  Assigned to the same assignee.

The above application and patent are hereby incorporated by reference into this application.

FIELD OF THE INVENTION

The present invention relates to electrical scales and, more particularly, to methods and apparatus for selecting one of a plurality of possible operating modes and/or parameters in an electrical scale.

BACKGROUND OF THE INVENTION

The term "mode" as used herein will include, for example, the processes of taring, calibrating, weighing, counting and determining whether the scale has come to a stand-still position. The operating parameters included herein comprise parameters such as integration time and weighing range. For purposes of this invention as claimed, the term "modes" must be understood to include parameters. Further, the above mentioned modes and parameters will very seldom all be present or selectable in one and the same scale. On the other hand, modes and parameters not mentioned above may well be included in a particular application.

In conventional scales, a separate selecting element is generally provided for selecting each mode or parameter. For example, one switch may be provided for taring, one for calibrating, and another for switching from the weighing to the counting mode or from one to another weighing range. Still another separate selecting element may be provided for switching a stand-still control on or off. Step switches are generally provided to change the integration time or the sensitivity of the stand-still control. Such conventional scales thus require a multiplicity of selection elements, thus not only increasing the expense of the apparatus but also increasing the difficulty of operating the scale, since, each time, the relevant selecting element must be individually chosen and operated.

SUMMARY OF THE INVENTION

In accordance with the present invention, a single selecting element such as a key or a switch controls all the above-mentioned selections. Continuous operation of the key, such as a continuous depression, causes the individual modes and/or parameters to be selected in sequence, each so-selected mode or parameter being displayed for the operator's information. The mode or parameter present when the key or other selecting element is released is the mode or parameter which is retained. Operation of a single selecting element thus allows any one of a multiplicity of modes and/or parameters to be selected. Information regarding the then-present parameter can be supplied to the operator by means of a visual display or, possibly, acoustically. The two monitoring methods could also be combined.

Further in accordance with the invention, if the value of a selected parameter such as, for example, the integration time, is to be changed, this can be accomplished by a short activation of the same selecting element.

The type of selecting element and the manner of operating such a selecting element can be chosen arbitrarily for the desired application. Currently preferred is a selecting element which is operated in the same direction at all times; for example, a key which is always depressed.

As mentioned above, not all modes and parameters will always be relevant for one and the same scale. Additionally, it may be desirable to restrict certain selections and adjustments of given modes or parameters to particular persons such as, for example, repair personnel. Such parameters should not be included in the sequences of operator-selectable quantities. It is another feature of the present invention that adjustable components are provided in the electrical circuit so that different operating modes and parameters may be inserted into or removed from the sequence available to the operator.

In a particularly preferred embodiment of the invention, the single selecting element is an elongated key horizontally arranged at the front of the scale as described in the cross-referenced patent application. This allows an almost "blind" operation of the key, so that the operator can concentrate fully on the display.

BRIEF DESCRIPTION OF THE DRAWINGS

FIG. 3 is a perspective view of the scale;
and
FIG. 4 is a schematic diagram of part of the electrical circuit of the scale.

DESCRIPTION OF PREFERRED EMBODIMENTS

The present invention will be described with reference to a scale having electro-magnetic load compensation. Such scales are well-known. In such scales, the weight on the scale is determined by periodic integration of a load proportional compensation current. The result of the integration process is displayed digitally. However, the present invention is not to be restricted to this type of scale. It is equally useful in scales operating according to any one of a number of different weighing principles.

The illustrative scale also has the following features, each of which is, in itself, conventional:

A digital segmental display;
Digital taring;
Weighing range selection: (a range entitled "ANAL." extending to 160 grams at a resolution of 0.1 mg. and a range "SEMI" to 30 grams at a resolution of 0.01 mg.);
A standby circuit which blanks the display even though power continues to be supplied;
A calibration mode in which, following application of a calibration weight to the scale, the scale automatically computes a correction factor for sensitivity changes. The application of the weight may be manual or semi- or even fully automatic.
Adjustability of integration time, that is, the time for digitalization of a weight: at least in two stages; and A stand-still control which may be an on-off control and/or may have a number of stages of different sensitivity.

Figure 1:
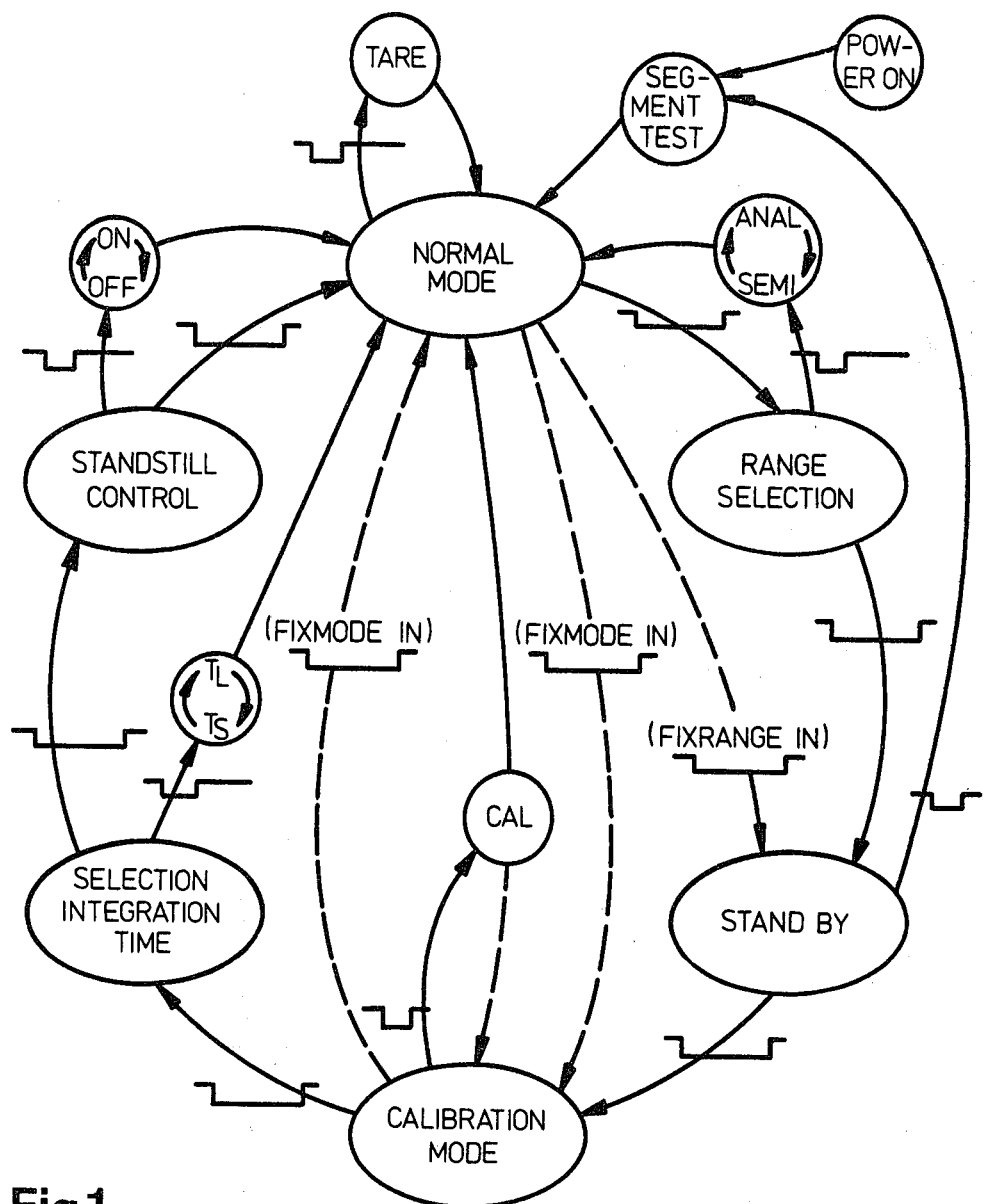
FIG. 1 is a schematic diagram illustrating the individual modes and parameters and the selection sequence.

Referring now to FIG. 1, the step of inserting the plug into the power supply or operation of the main power switch is illustrated at the top right hand side by the circle "power on". This initiates a display test which causes all segments including decimal points and other symbols of the display to be illuminated ("segment test"). Therefore, the normal mode of operation has been reached (normal mode) and the scale is ready for weighing.

The single key of the scale may be operated in two ways:

A short depression of the key, or
a long depression of the key.

The boundary between "short" or "long" is here chosen to be two seconds.

The substantially circular main curve in the diagram illustrates the sequence which results during a long depression of the key. This is symbolized in the diagram by a pulse having a relatively long pulse width between the individual modes or phases. As each phase is reached, its name is displayed. An exception is the "standby" phase which is characterized by a complete blanking of the display. For any given parameter, the particular range or value that is being selected is also displayed. For example, for the phase of "integration time" either "SHORT INT. TIME" or "LONG INT. TIME" might be displayed, while, if the integration time is adjustable in steps, a typical display may be "INT. TIME 3 S" for an integration time of three seconds.

Continuous depression of the key causes a complete run-through of the main loop until the normal mode is again reached. This requires approximately 12 seconds in the given example. Thereafter, if the key remains depressed no further change takes place. For further changes, the key must first be released. This eliminates the irritating round robin that might otherwise result.

If the key is depressed briefly while in the normal mode, a tare command results. A short pressing of the key is symbolized in the diagram by a short pulse. A short depression of the key after it has been released in another phase or mode causes the generation of commands as follows:

When in the phase "RANGE SELECTION", a new range is switched in;

In the phase "INTEGRATION TIME" it is switched to the longer or the shorter integration time;

In the phase "STAND-STILL CONTROL" this control is either switched in or switched out;

In "STANDBY" the system switches back to the normal mode after first having carried out a renewed test of all segments; and In the calibration phase, the equipment is calibrated. This will be described in greater detail with reference to FIG. 2.

When a parameter has been changed as described above or a calibration process has taken place, the remainder of the sequence is skipped and the equipment switches back to operation in the normal mode. This process can occur automatically after a predetermined time interval, or can be manually initiated by a renewed long pressing of the key. Alternatively it would of course also be possible to run through the remainder of the sequence if the key is depressed for a long time after a change in a parameter.

Additionally, 3 broken lines are shown in FIG. 1, two designated as "FIXED MODE IN" and one designated as "FIXED RANGE IN". As mentioned above, it may be desirable to reduce the number of selectable phases or modes during routine operations. As described in greater detail in relation to FIG. 4 below, it is for example possible to block range selection so that routinely, weighing takes place in a fixed range only ("FIXED RANGE IN"). Under these conditions, the sequence starts in "STANDBY" and then continues as illustrated through all the remaining phases. In another embodiment, all parameters are fixed and can be changed only by manipulation within the scale as described below. In this embodiment, a long depression of the key causes the equipment to switch to the calibrating mode, the only selectable mode in this embodiment.

Figure 2:
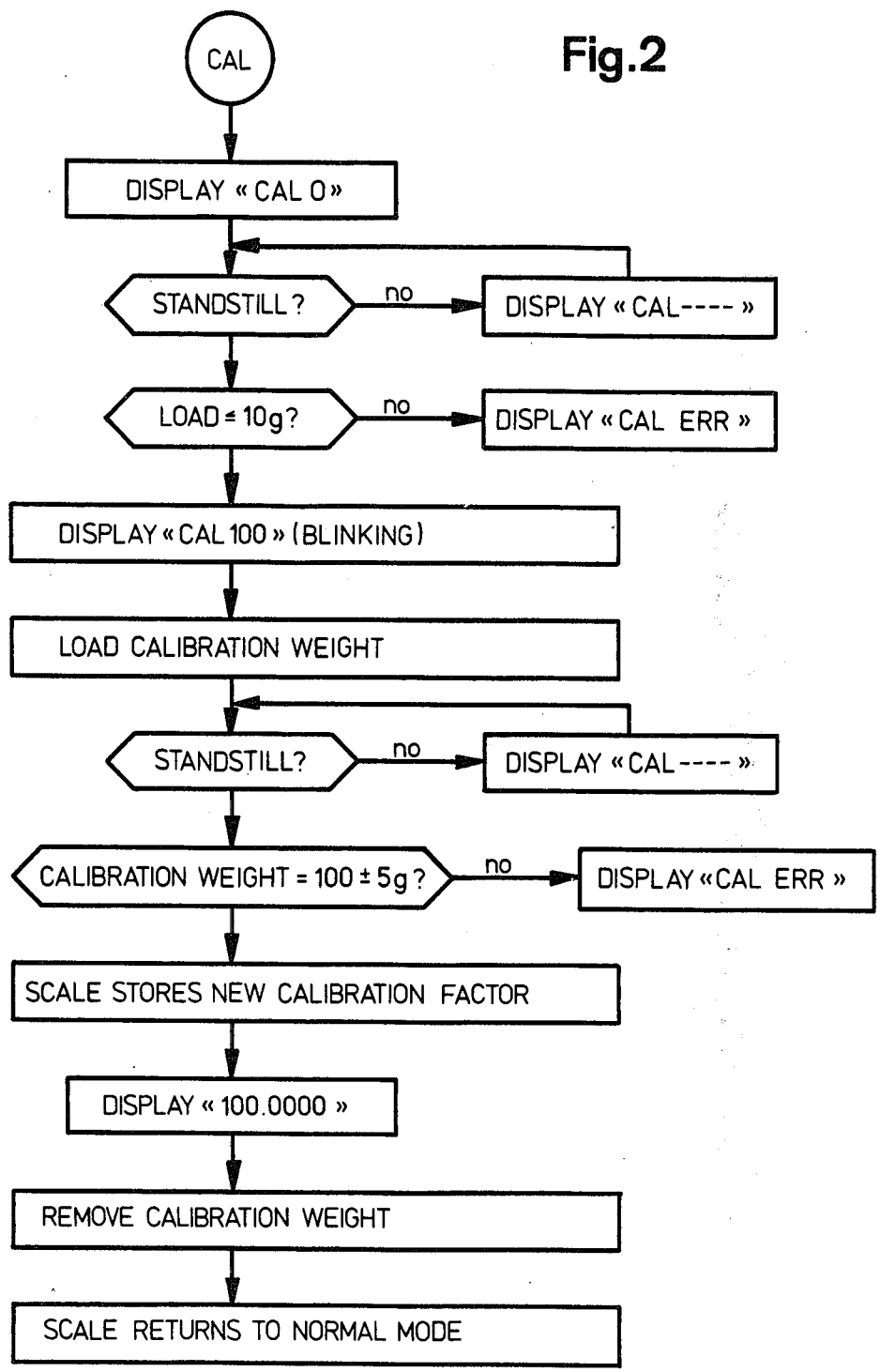
FIG. 2 is a flow chart for the calibration process.

The calibration mode is described in greater detail with reference to FIG. 2. An equally detailed description of the various other modes illustrated in FIG. 1 will not be given, since one skilled in the art can readily derive such operation by analogy with that of FIG. 2, in so far as such operation is not entirely obvious. Referring now to FIG. 2, a long depression of the key causes the word "CALIBRATE" to appear in the display. The key is now released and subsequently briefly depressed. The display now shows "CAL 0" as a control signal. The remaining calibration takes place substantially automatically, optical information being furnished to the operator as the calibration process progresses. A test is carried out as to whether the stand-still condition has been reached, i.e., whether the platform, etc. is sufficiently stationary to allow proper operation. Until this condition has been reached, the display shows "CAL—". The next test that is carried out is whether the load applied to the scale is less than 10 grams. If this is not the case, the signal "CAL ERR" (error) is displayed and indicates to the operator that either a substance has been put on the scale or has been mistakenly left on the scale and should be removed. When the load on the scale is less than 10 grams, the display blinks "CAL 100" to indicate to the operator that the calibrating weight is to be applied. As soon as this has happened, a stand-still is again awaited, the display being "CAL—". Thereafter, a test is carried out whether the standard calibration weight of 100 grams has been registered by the scale at least approximately. If this is not the case, for example because the wrong weight has been put on the scale, the words "CAL ERR" are displayed. If the weight registered by the scale is sufficiently close to the calibrating weight, the new calibration factor is calculated from the nominal and the measured weight and this value is stored for the subequent weighing operations. The display shows "100.0000" and the calibrating weight may be removed. Thereafter, the scale returns automatically to the normal mode.

The above example has been described for the case in which the scale operates in the "ANAL" range. If the "SEMI" range has been selected, calibration could have taken place with a weight of 20 grams.

The scale is shown in FIG. 3. It is denoted by reference numeral 10. Scale 10 has a platform 12, a digital display 14 and the key 16 which extends across the whole front of the scale. Depression of the key causes operation of at least one of the control switches 18 and 18'. This actual construction forms no part of the present invention but is described in detail in the cross-referenced copending application.

The components constituting the scale are shown, partially in block diagram form, in FIG. 4. The basic element of the circuit is a microcomputer 20 which has the usual component, i.e. an arithmetic unit, either CPU or microprocesor, a fixed storage ROM, a random access memory RAM, etc. The digitalized weight signal is applied to a counter 22 whose output furnishes the results of the computation to microcomputer 20 for further processing. Clock signals are furnished by a clock 24. Digital display 14 is controlled by microcomputer 20 through a decoder-driver stage 26.

It will be noted that the system of the present invention or the apparatus necessary to implement the inventive method are herein constituted by equipment operating under the control of a program. Of course it would be equally possible to construct a system using discrete components or integrated logic circuits.

As has been discussed above, it may, under certain circumstances, be desirable to eliminate some modes or parameters from the sequence illustrated in FIG. 1. This is accomplished by the circuitry shown on the left hand side of FIG. 4. In FIG. 4, switch 18 is connected through a line 28 to an input 30 of microcomputer 20. Similarly, lines 32 and 36 are connected, respectively, to inputs 34 and 38. Three resistors 40 are provided to connect each of lines 28, 32 and 36 to a voltage Vcc, so that a logic "1" will appear at inputs 30, 34 or 38 when switch 18 is open and lines 32 and 36 are broken. When key 18 is depressed, a logic "0" appears at input 30. If key 18 is released within 2 seconds, input 30 returns to "1" which operates as a command within the then-present phase. For example, during the normal mode it will constitute a tare command. If key 18 remains depressed for longer than 2 seconds, the sequence illustrated in FIG. 1 is started and continues until the key is again released.

The phases "FIX RANGE" and "FIX MODE" are assigned to lines 32 and 36, respectively. As long as jumpers 42 and 44 are absent, a logic "1" appears at inputs 34 and 38. If one of the jumpers is inserted, the associated input goes to "0". A "0" signal at one of these inputs causes microcomputer 20 to skip certain addresses in the ROM during a long depression of key 16, thereby shortening the sequence as described above. Specificially, jumper 42 which is assigned to the "FIX RANGE" mode causes the range selector phase to be skipped, while jumper 44 causes all phases except the calibration mode to be skipped.

It is obvious that additional branches including lines, resistors and jumpers can be provided for any alternative desired changes of the sequence of FIG. 1.

A separate storage (RAM) 46 is provided external to microcomputer 20 for storage of the calibration factors. Use of a separate battery 48 allows retaining of the calibration factor even during power outages. If this is not considered necessary, and an EAROM can be provided, (that is an electrically alterable read only memory), a separate battery would no longer be required.

It will be evident from the above description that many variations of the basic invention are possible and that the overall system and method of the present invention are readily amenable to adaption to different requirements and operating conditions. For example, the invention could be implemented with a known combined power-tare key in which the first depression of the key causes power to be supplied or the display to be activated, respectively, a subsequent depression causing the remainder of the above-described sequence to be run. In this embodiment, the power supply is disconnected from the equipment or the display is blanked, respectively (stand-by version), by lifting of the key.

The above-mentioned provision of additional jumpers can allow particular parameters in a given scale to be eliminated from the sequence, thereby, for example, decreasing the possibility of error in routine weighing operations.

All of the above-mentioned variations, in addition to many others which will be readily apparent to one skilled in the art are intended to be encompassed in the following claims.

We claim:

1. Method for operator-controlled selection of one of a plurality of operating modes available in an electrical scale having a single selector element, comprising the steps of selecting each of said operating modes in sequence and furnishing a corresponding mode identification signal to said operator during continuous activation by said operator of said single selector element; and wherein said scale subsequently operates in accordance with the mode present when said operator releases said single selector element.

2. The method as set forth in claim 1, wherein activation of said single selector element is a unidirectional operation of said element.

3. A method as set forth in claim 1, wherein at least one of said modes comprises a first and second submode; and wherein operation of said scale switches from said first to said second or from said second to said first submode in response to a brief activation of said single selector element while said scale is operative in said one of said modes.

4. Apparatus for operator controlled selection of one of a plurality of operating modes or parameters of an electrical scale, comprising a single selector element;

means for selecting each of said plurality of operating modes or parameters in sequence during continuous activation of said single selector element;

means for furnishing to said operator mode identification signals signifying each of said modes when selected; and means responsive to release of said single selector element for operating said scale in accordance with the then-selected mode.

5. Apparatus as set forth in claim 4, further comprising means for eliminating at least one of said operating modes from said sequence.

6. Apparatus as set forth in claim 4, wherein said single selector element is operable in one direction only.

7. Apparatus as set forth in claim 4, wherein said single selector element is an elongated key.

* * * * *